Nov. 1, 1938.          A. HOLZAPFEL          2,135,395
           MANUFACTURE OF MULTICOLORED RUBBER MIXINGS
                      Filed Dec. 14, 1937
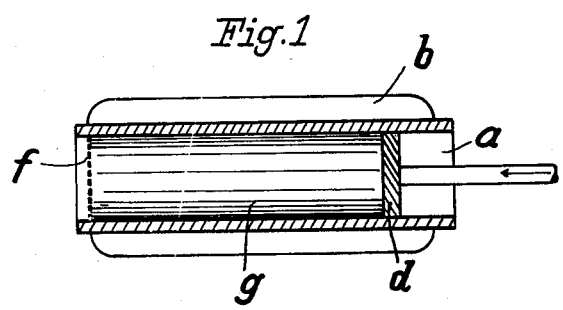
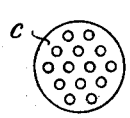 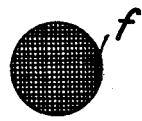
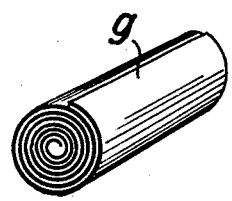
Inventor:
A. HOLZAPFEL
By Blair Kilsayne
ATTYS Patented Nov. 1, 1938

2,135,395

UNITED STATES PATENT OFFICE 2,135,395

MANUFACTURE OF MULTICOLORED RUBBER MIXINGS

Attalus Holzapfel, Wiesbaden-Eigenheim, Germany, assignor to Ernst Frölich, Osterode/Harz, Germany Application December 14, 1937, Serial No. 179,751
In Germany June 10, 1936

1 Claim. (Cl. 18—55)

The present invention relates to improvements in the manufacture of colored rubber mixings, in which a marble effect or other variegated color effect is obtained when using two or more pigments or dyestuffs.

The procedure hitherto adopted in producing colored rubber goods of the kind referred to consisted in preparing single color mixings for producing a marble or similar effect, drawing these mixings into sheets, rods or strips, heating the latter to varying temperatures and then passing the assembled sheets, rods or strips once or several times through a calender until the desired thickness was obtained, whereupon the material was worked up into rubber goods in known manner. This known process however proved inefficient when it was desired to produce a particular grain, for instance for reproducing the grain of wood or for producing fine grains as required for instance in reproducing the appearance of flesh. In the processes hitherto used it was not possible to achieve effects of this nature, because the admixture of rubber mixings of various colors produces an arbitrary result, so that the course of the grain or the strength of the lines cannot be predetermined.

In order to produce particular patterns it has also been proposed to assemble sheets, prisms or strips, which have been differently colored, according to a particular scheme, and to compress and spread the block so obtained. It is not possible however in this manner to obtain fine veins of the desired effect, since the result to this method of producing colored rubber goods is much too coarse and irregular.

According to the invention multicolored rubber mixings are obtained by assembling in superposition variously colored sheets of natural or synthetic rubber in any desired number and pressing the assembled sheets through a wire lattice or through perforated sheet metal, the holes of which correspond as regards size and shape to the veins, grain or other effect which it is desired to obtain in the finished article.

The advantages so obtained consist in that it is possible in this manner to produce in the rubber mixings any desired marble effect, veins effect or grain. The grain of wood, for instance, can readily be reproduced by proceeding according to the invention. Further, articles made of rubber can be provided with any desired design and have the advantage compared with printed rubber goods that the design is durable. Rubber mixings obtained according to the invention may also be used for instance for surgical prothesis, i. e. artificial limbs, plates for replacing teeth and the like. It is well known that it is particularly desirable in producing articles of this kind that the color of the rubber goods is closely adapted to the purpose of these goods so that the substitution of rubber is not noticed. By means of the invention all natural colors and veins can be accurately reproduced. By finely dispersing the pigments or dyestuffs in a suitable manner, it is possible moreover to obtain quite new effects, which could not hitherto be obtained from single color rubber mixings.

The process of the invention can be used for natural as well as for synthetic rubber as well as for synthetic products which are formed by heating and which can be treated by processes resembling those used in connection with rubber.

A mode of construction of the appliance used for the process of the invention is shown by way of example in the accompanying drawing, in which:

Fig. 1 is a diagrammatic illustration of the whole appliance,
Fig. 2 shows a sieve,
Fig. 3 a perforated metal sheet and
Fig. 4 the parent material.

The appliance for carrying out the process of the invention comprises a steel cylinder $a$, which is preferably provided with heating channels $b$. One end of cylinder $a$ is closed with a metal sieve $f$, the holes of which may be round or have any other desired shape. A piston $d$ which is fitted in cylinder $a$ presses the rubber mass $g$ along the cylinder and through sieve $f$. The rubber mass $g$ consists of rolled up colored unvulcanized rubber sheets. Instead of sieve $f$ a perforated metal sheet $c$ may be used, as shown in Fig. 2.

The mode of operation is as follows: The single color rubber mixing is drawn as usual into sheets on a calender. These sheets are then superposed according to the desired multicolored pattern, for instance red and white sheets, if only a two colored pattern is required, and the sheets are then rolled up to the size of roll which fits into the cylinder $a$. After insertion of the roll in the cylinder, the channels $b$ of which are heated to soften the rubber, the rubber mass $g$ is pressed through sieve $f$ by means of piston $d$. In accordance with the structure of the sieve the rubber mass is divided into more or less fine veinlike filaments of different colors. The mixing so obtained can then be moulded and vulcanized in any desired manner.

What I claim and desire to secure by Letters Patent of the United States is:

A process for the production of longitudinally veined rubber goods from a plurality of unvulcanized, multi-colored rubber sheets, each of a single color throughout, which comprises the steps of superimposing the sheets according to a desired color pattern, forming the superimposed sheets into a roll, heating the roll whereby to plastify the rubber, maintaining the roll against radial displacement while applying endwise pressure on the roll as such so as to cause it to move longitudinally through an element provided with a multiplicity of apertures, whereby the rubber sheets are extruded into a multiplicity of vein-like filaments of different colors, with the filaments corresponding in size and shape to the apertures of the element, molding the filaments into a rubber article of the desired shape and vulcanizing said article.

ATTALUS HOLZAPFEL.